(12) United States Patent
Ma

(10) Patent No.: US 12,584,992 B2
(45) Date of Patent: Mar. 24, 2026

(54) AUTOMOBILE MILLIMETER-WAVE RADAR FIXING DEVICE

(71) Applicant: Autel Intelligent Technology Corp., Ltd., Shenzhen (CN)

(72) Inventor: Yanwen Ma, Shenzhen (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 273 days.

(21) Appl. No.: 18/552,671

(22) PCT Filed: Mar. 17, 2022

(86) PCT No.: PCT/CN2022/081404
§ 371 (c)(1),
(2) Date: Sep. 27, 2023

(87) PCT Pub. No.: WO2022/213785
PCT Pub. Date: Oct. 13, 2022

(65) Prior Publication Data
US 2024/0069153 A1 Feb. 29, 2024

(30) Foreign Application Priority Data

Apr. 6, 2021 (CN) .......................... 202110369200.4

(51) Int. Cl.
*G01S 7/02* (2006.01)
*G01S 13/931* (2020.01)
(52) U.S. Cl.
CPC ............ *G01S 7/027* (2021.05); *G01S 13/931* (2013.01)
(58) Field of Classification Search
CPC ................................ G01S 7/027; G01S 13/931
See application file for complete search history.

(56) References Cited

U.S. PATENT DOCUMENTS 6,340,142 B1 1/2002 Li
6,842,152 B2 * 1/2005 Kikuchi ............... H01Q 1/3233
343/878
(Continued)

FOREIGN PATENT DOCUMENTS

CN 101764363 A 6/2010
CN 207902300 U 9/2018
(Continued)

OTHER PUBLICATIONS

The Office Action of CN patent application No. 202110369200.4 issued on Mar. 12, 2025.
(Continued)

*Primary Examiner* — Marcus E Windrich
(74) *Attorney, Agent, or Firm* — Andrew C. Cheng

(57) ABSTRACT

The automobile millimeter-wave radar fixing device includes: a first clamping housing, the first clamping housing being U-shaped, and having one end provided with a first rotatable connection structure and the other end provided with a first fixed connection structure; a second clamping housing, the second clamping housing being U-shaped, and having one end provided with a second rotatable connection structure and the other end provided with a second fixed connection structure, the second rotatable connection structure being rotatably connected to the first rotatable connection structure, the second fixed connection structure being fixedly connected to the first fixed connection structure, and a clamping space being formed between the first clamping housing and the second clamping housing; and an angle adjusting support, fixed to the second clamping housing and used for fixing and adjusting an angle of a millimeter-wave radar.

9 Claims, 5 Drawing Sheets

(56) References Cited

U.S. PATENT DOCUMENTS

| | | | | |
|---|---|---|---|---|
| 6,954,174 | B2 * | 10/2005 | Isaji | G01S 7/4026 |
| | | | | 342/174 |
| 7,346,994 | B2 * | 3/2008 | Shevela | G01S 7/4972 |
| | | | | 33/600 |
| 7,675,460 | B2 * | 3/2010 | Sanada | G01S 7/4026 |
| | | | | 342/174 |
| 9,673,517 | B2 * | 6/2017 | Tran | H01Q 1/42 |
| 9,718,405 | B1 * | 8/2017 | Englander | G01S 13/931 |
| 11,187,780 | B2 * | 11/2021 | Matori | G01S 7/03 |
| 11,719,561 | B2 * | 8/2023 | Kortlang | G01D 11/245 |
| | | | | 73/431 |
| 2003/0184471 | A1 * | 10/2003 | Tohyama | H01Q 1/125 |
| | | | | 342/75 |
| 2004/0227663 | A1 * | 11/2004 | Suzuki | G01S 13/931 |
| | | | | 342/72 |
| 2004/0239574 | A1 * | 12/2004 | Zeiher | G01S 7/02 |
| | | | | 343/757 |
| 2015/0041604 | A1 * | 2/2015 | Dihlmann | B60R 11/00 |
| | | | | 248/292.12 |
| 2016/0218420 | A1 * | 7/2016 | Leung | G01S 13/931 |
| 2020/0249343 | A1 * | 8/2020 | Yu | G01S 13/93 |
| 2021/0389415 | A1 * | 12/2021 | Yamauchi | H01Q 1/3233 |
| 2022/0291332 | A1 * | 9/2022 | Kim | G01S 13/931 |

FOREIGN PATENT DOCUMENTS

| | | | |
|---|---|---|---|
| CN | 209570694 | U | 11/2019 |
| CN | 111664335 | A | 9/2020 |
| CN | 211741548 | U | 10/2020 |
| CN | 212207654 | U | 12/2020 |
| CN | 113093114 | A | 7/2021 |
| CN | 215180838 | U | 12/2021 |

OTHER PUBLICATIONS

The search report of CN patent application No. 202110369200.4 issued on Mar. 12, 2025.

International Search Report of PCT Patent Application No. PCT/CN2022/081404 issued on May 26, 2022.

The extended European Search Report of EP Patent Application No. 22783854.7 issued on Jul. 4, 2024.

The Search Report of CN Patent Application No. 202110369200.4 issued on Sep. 19, 2024.

The first office action of CN Patent Application No. 202110369200.4 issued on Sep. 19, 2024.

* cited by examiner

100

120

130

110

140

AUTOMOBILE MILLIMETER-WAVE RADAR FIXING DEVICE

CROSS-REFERENCE TO RELATED APPLICATIONS

This application is the National Stage application for PCT patent application Serial No. PCT/CN2022/081404, filed on Mar. 17, 2022, which claims priority to Chinese Patent Application No. 202110369200.4, entitled "Automobile Millimeter-Wave Radar Fixing Device", filed on Apr. 6, 2021, before the Patent Office of the China National Intellectual Property Administration, which is incorporated herein by reference in its entirety.

TECHNICAL FIELD

Embodiments of the present invention relate to the technical field of automobile radar fixing, and in particular to an automobile millimeter-wave radar fixing device and an automobile.

BACKGROUND OF THE INVENTION

An existing automobile millimeter-wave radar is fixed by respectively forming through holes allowing bolts to penetrate in a radar support and an automobile bumper. In this way, the automobile bumper and the radar support are increased in production process, reduced in assembly efficiency, and relatively poor in structural stability.

SUMMARY OF THE INVENTION

In view of the above-mentioned problem, embodiments of the present invention provide an automobile millimeter-wave radar fixing device and an automobile, which can enhance the stability of a millimeter-wave radar when the millimeter-wave radar is fixed on the automobile, and achieves quick assembly of the millimeter-wave radar on an automobile body.

According to one aspect of embodiments of the present invention, provided is an automobile millimeter-wave radar fixing device, including: a first clamping housing, the first clamping housing being U-shaped, and having one end provided with a first rotatable connection structure and the other end provided with a first fixed connection structure; a second clamping housing, the second clamping housing being U-shaped, and having one end provided with a second rotatable connection structure and the other end provided with a second fixed connection structure, the second rotatable connection structure being rotatably connected to the first rotatable connection structure, the second fixed connection structure being fixedly connected to the first fixed connection structure, and a clamping space for accommodating a frame of an automobile being formed between the first clamping housing and the second clamping housing; and an angle adjusting support, the angle adjusting support being fixed to a side, away from the clamping space, of the second clamping housing and being used for fixing and adjusting horizontal and pitch angles of a millimeter-wave radar.

In an optional implementation, the first rotatable connection structure includes a first shaft hole disposed in one end of the first clamping housing, the second rotatable connection structure includes second shaft holes disposed in one end of the second clamping housing, and the first shaft hole is rotatably connected to the second shaft holes via a pivot shaft.

In an optional implementation, the first fixed connection structure includes a first connection plate body disposed on the other end of the first clamping housing, the second fixed connection structure includes a second connection plate body disposed on the other end of the second clamping housing, and the first connection plate body is fixedly connected to the second connection plate body.

In an optional implementation, the angle adjusting support includes a first fixing plate, three ball head fixing blocks, and three ball head bolts, the first fixing plate is used for fixing the millimeter-wave radar, the three ball head fixing blocks are fixed to the second clamping housing, the ball head fixing blocks are provided with spherical grooves, ball head ends of the ball head bolts are rotatably clamped in the spherical grooves, and threaded ends of the ball head bolts are connected to the first fixing plate.

In an optional implementation, inner walls of the spherical grooves are provided with flexible rubber layers.

In an optional implementation, a raised plate body is formed on the second clamping housing in a direction where the first fixing plate is located, penetration holes allowing the ball head fixing blocks to penetrate are formed in the raised plate body, an accommodating space for accommodating the ball head fixing blocks is formed on the inner side of the raised plate body, the angle adjusting support further includes a second fixing plate, the second fixing plate includes a main plate body disposed on a side, away from the first clamping housing, of the raised plate body and fixedly connected to the ball head fixing blocks, and a fixing plate body formed by vertically extending at least partial edge of the main plate body to a direction where the raised plate body is located, and then, vertically extending the same to the outer side, the ball head bolts penetrate through the main plate body, and the fixing plate body is fixedly connected to the raised plate body.

In an optional implementation, the ball head fixing blocks are provided with buckles parallel to the ball head bolts, the main plate body is provided with openings adapted to the buckles, and the buckles are clamped in the openings.

In an optional implementation, first threaded holes and second threaded holes are formed in the first fixing plate, first threaded holes are connected to the threaded ends of the ball head bolts, and the second threaded holes are used to be connected to the millimeter-wave radar.

In an optional implementation, the automobile millimeter-wave radar fixing device further includes a buffer gasket, and the buffer gasket is attached to a side, facing the clamping space, of the first clamping housing and a side, facing the clamping space, of the second clamping housing.

According to the other aspect of embodiments of the present invention, provided is an automobile, including a frame, a bumper, a millimeter-wave radar, a radar interface, a vehicle controller, and the automobile millimeter-wave radar fixing device, the frame being disposed on the inner side of the bumper, the frame being accommodated in the clamping space, the second clamping housing and the first clamping housing being clamped and fixed on the frame, the millimeter-wave radar being fixed to the angle adjusting support and being disposed to face the bumper, the radar interface being connected to a socket of the millimeter-wave radar, and the radar interface being electrically connected to the vehicle controller.

By forming the clamping space for accommodating the frame of the automobile between the first clamping housing and the second clamping housing, the automobile millimeter-wave radar fixing device in the embodiment of the present invention achieves the fixation of the angle adjusting support on the frame, and then, achieves the fixation of the millimeter-wave radar and the adjustment of a pitch angle. In order to facilitate dismounting or mounting the automobile millimeter-wave radar fixing device on the frame, the first rotatable connection structure and the second rotatable connection structure which are rotatably connected as well as the first fixed connection structure and the second fixed connection structure which are fixedly connected are respectively disposed on two ends of the first clamping housing and the second clamping housing.

The above-mentioned description is merely a summary of the technical solutions of the present invention. In order to more clearly know about the technical means of the present invention, they may be implemented according to the content of the description. Moreover, in order to make the above-mentioned and other objectives, features, and advantages of the present invention more obvious and comprehensible, the specific implementations of the present invention will be listed below.

BRIEF DESCRIPTION OF DRAWINGS

By reading detailed description for following preferred implementations, various other advantages and benefits will become clear to those of ordinary skill in the art. Accompanying drawings are merely intended to show the preferred implementations, rather than to be regarded as limitations to the present invention. Moreover, the same reference symbols are used to represent the same parts in the overall accompanying drawings in which.

Figure 1:
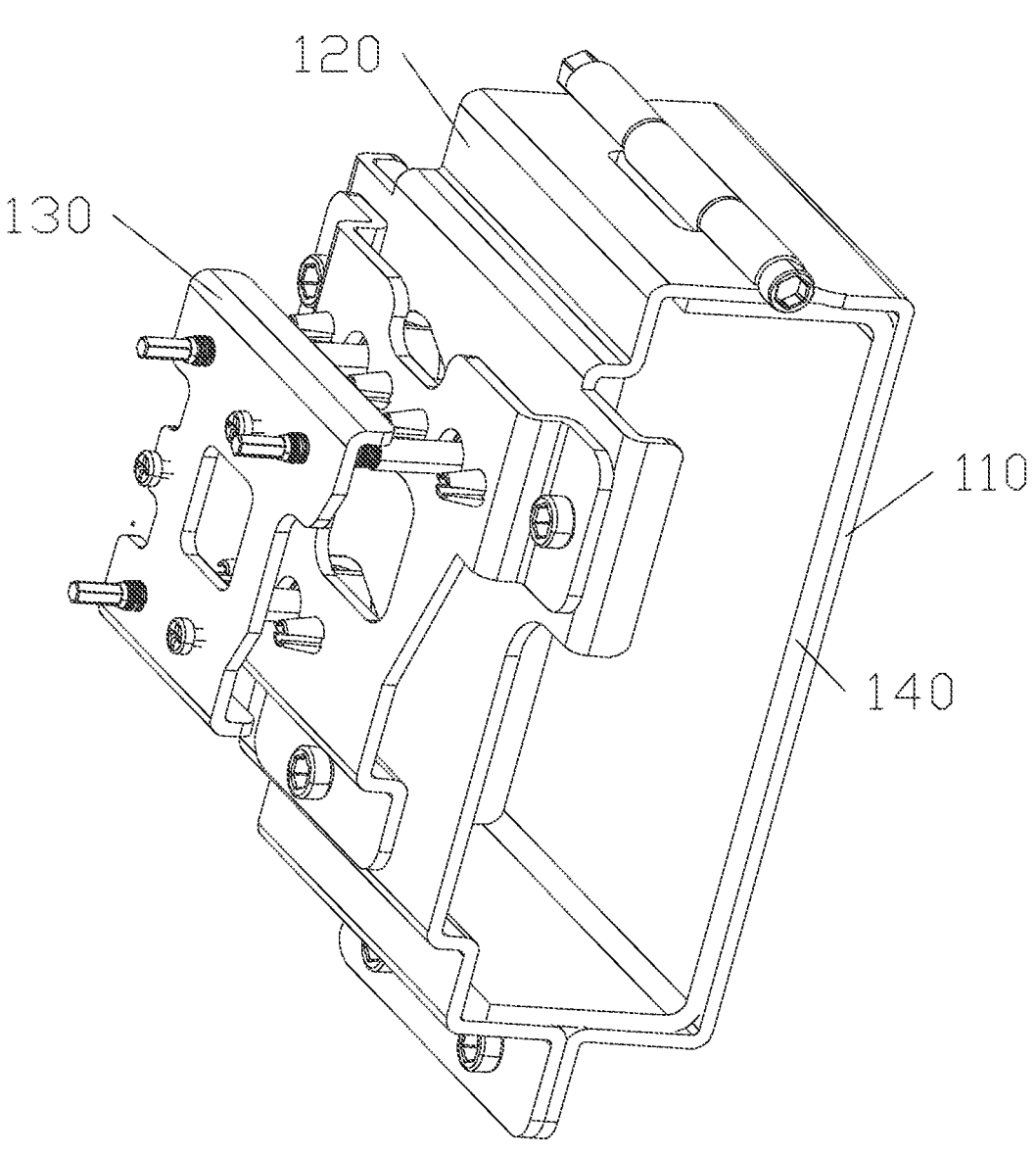
FIG. 1 is a schematic structural diagram of a fixing device provided in an embodiment of the present invention.

Numerals in the accompanying drawings in specific implementations are shown as follows:

fixing device 100, first clamping housing 110, first shaft hole 111, first connection plate body 112, second clamping housing 120, second shaft hole 121, second connection plate body 122, raised plate body 123, penetration hole 124, supporting plate body 125, angle adjusting support 130, first fixing plate 131, ball head fixing blocks 132, ball head bolt 133, main plate body 134, fixing plate body 135, buckle 136, opening 137, first threaded hole 138, second threaded hole 139, buffer gasket 140, bolt 150, nut 151, frame 200, bumper 300, millimeter-wave radar 400, and radar interface 500.

DETAILED DESCRIPTION OF THE INVENTION

Embodiments of technical solutions of the present invention will be described in detail below in conjunction with the accompanying drawings. The following embodiments are merely intended to more clearly describe the technical solutions of the present invention so as to be merely used as examples, rather than limitations on the protection scope of the present invention.

According to one aspect of embodiments of the present invention, provided is an automobile millimeter-wave radar fixing device which can enhance the stability of a millimeter-wave radar when the millimeter-wave radar is fixed on an automobile, and achieve quick assembly of the millimeter-wave radar on an automobile body.

Figure 2:
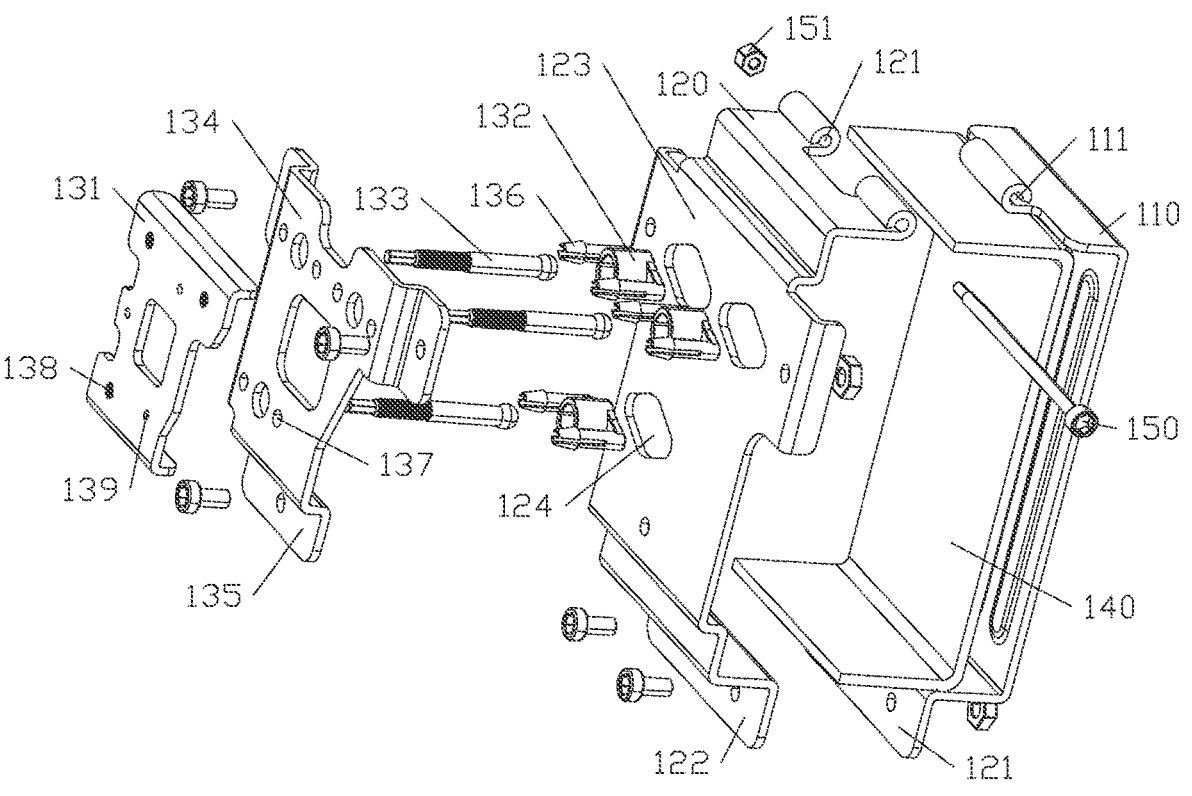
FIG. 2 is a schematic diagram of an exploded structure of a fixing device provided in an embodiment of the present invention.
Figure 3:
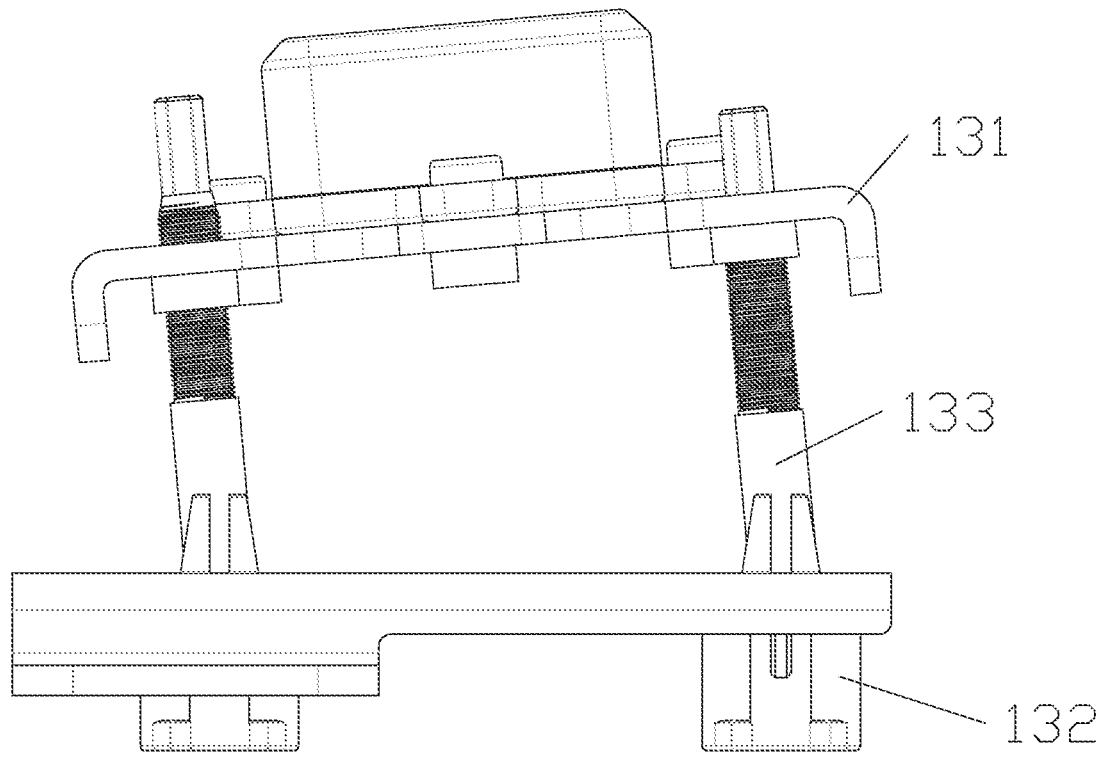
FIG. 3 is a schematic diagram of a side view structure achieved after an angle adjusting support in a fixing device provided in an embodiment of the present invention is connected to a millimeter-wave radar and is configured to adjust an angle of the radar.

Refer to FIG. 1 and FIG. 2 in which an overall structure and exploded structure of an automobile millimeter-wave radar fixing device 100 in an embodiment of the present invention is schematically shown.

As shown in the figures, the fixing device 100 includes a first clamping housing 110, a second clamping housing 120, and an angle adjusting support 130. The first clamping housing 110 is U-shaped, and has one end provided with a first rotatable connection structure and the other end provided with a first fixed connection structure. The second clamping housing 120 is U-shaped, and has one end provided with a second rotatable connection structure and the other end provided with a second fixed connection structure, the second rotatable connection structure is rotatably connected to the first rotatable connection structure, the second fixed connection structure is fixedly connected to the first fixed connection structure, and a clamping space for accommodating a frame of an automobile is formed between the first clamping housing 110 and the second clamping housing 120. The angle adjusting support 130 is fixed to a side, away from the clamping space, of the second clamping housing 120 and is used for fixing and adjusting horizontal and pitch angles of a millimeter-wave radar.

By forming the clamping space for accommodating the frame of the automobile between the first clamping housing 110 and the second clamping housing 120, the fixing device 100 in the embodiment of the present invention achieves the fixation of the angle adjusting support 130 on the frame, and then, achieves the fixation of the millimeter-wave radar and the adjustment of a pitch angle. In order to facilitate dismounting or mounting the fixing device on the frame, the first rotatable connection structure and the second rotatable connection structure which are rotatably connected as well as the first fixed connection structure and the second fixed connection structure which are fixedly connected are respectively disposed on two ends of the first clamping housing 110 and the second clamping housing 120.

When the fixing device 100 is assembled on the frame, firstly, the first rotatable connection structure is connected to the second rotatable connection structure, so that the first clamping housing 110 and the second clamping housing 120 can rotate relatively; and then, the first clamping housing 110 and the second clamping housing 120 are buckled on the frame, and the fixing device 100 is fixed to the frame of the automobile by fixed connection between the first fixed connection structure and the second fixed connection structure. The assembly process is convenient and quick, and easy to operate, the assembly efficiency of the fixing device 100 and the frame of the automobile can be effectively increased, and then, the convenient and quick mounting and fixation of the millimeter-wave radar on the frame are achieved.

Refer to FIG. 2 again, in some embodiments, the fixing device 100 may further include a buffer gasket 140, and the buffer gasket 140 is attached to sides, facing the clamping space, of the first clamping housing 110 and the second clamping housing 120.

Due to the bumpiness and vibration of the automobile during running, bolt connecting pieces are easy to loosen after the automobile is used for a long time, which causes the deviation of a monitoring direction of the radar to result in radar monitoring errors.

In order to ensure the stability of the millimeter-wave radar after the automobile runs on a bumpy road and runs for a long time, and the monitoring accuracy of the radar, the buffer gasket 140 is disposed on the sides, facing the clamping space, of the first clamping housing 110 and the second clamping housing 120, that is, the buffer gasket 140 is attached among the first clamping housing 110, the second clamping housing 120 and the frame of the automobile to prevent the vibration of the frame of the automobile from affecting the stability of the millimeter-wave radar fixed to the fixing device 100 and the connection reliability of the connection structures in the fixing device 100.

Refer to FIG. 2 again, in some embodiments, the first rotatable connection structure may include a first shaft hole 111 disposed in one end of the first clamping housing 110, the second rotatable connection structure may include second shaft holes 121 disposed in one end of the second clamping housing 120, and the first shaft hole 111 is rotatably connected to the second shaft holes 121 via a pivot shaft.

The first shaft hole 111 is rotatably connected to the second shaft holes 121 via the pivot shaft, so that mutual rotation between the first clamping housing 110 and the second clamping housing 120 is achieved.

Further refer to FIG. 2, in a specific embodiment shown in the figure, the first shaft hole 111 may be formed by outwards extending and bending an end surface in the middle of an end of the first clamping housing 110, the second shaft holes 121 may be formed by outwards extending and bending end surfaces on two sides of an end of the second clamping housing 120, the pivot shaft includes a bolt 150, and the bolt 150 is connected to a nut 151 after penetrating through one of the second shaft holes 121, the first shaft hole 111 and the other second shaft hole 121 in sequence. The first shaft hole 111 and the second shaft holes 121 are respectively integrated with the first clamping housing 110 and the second clamping housing 120, which facilitates processing and production and achieving structural stability. The first shaft hole 111 is rotatably connected to the second shaft holes 121 by using the bolt 150 and the nut 151, so that the movement of the first clamping housing 110 and the second clamping housing 120 in an axial direction of the bolt 150 is limited while mutual rotation is achieved, and the stability of rotatable connection is ensured.

It should be understood by the skilled in the art that an example is only shown in the figure. In other embodiments, the first rotatable connection structure and the second rotatable connection structure may further include two bearings disposed on the first clamping housing 110 and the second clamping housing 120 and rotatably connected by a rotating shaft.

Refer to FIG. 2 again, in some embodiments, the first fixed connection structure may include a first connection plate body 112 disposed on the other end of the first clamping housing 110, the second fixed connection structure may include a second connection plate body 122 disposed on the other end of the second clamping housing 120, and the first connection plate body 112 is fixedly connected to the second connection plate body 122.

The mutual fixation of the first clamping housing 110 and the second clamping housing 120 on the other end is achieved by fixed connection between the first connection plate body 112 and the second connection plate body 122, and thus, the fixation of the fixing device 100 on the frame of the automobile is achieved.

Further refer to FIG. 2, in a specific embodiment shown in the figure, the first connection plate body 112 is formed by vertically extending the other end of the first clamping housing 110 to the outer side, the second connection plate body 122 is formed by vertically extending the other end of the second clamping housing 120 to the outer side, the first connection plate body 112 is parallel to the second connection plate body 122, and the first connection plate body 112 and the second connection plate body 122 are fixedly connected by using a threaded connecting piece after being attached. By fixedly connecting the first connection plate body 112 to the second connection plate body 122 by using the threaded connecting piece after disposing the first connection plate body 112 and the second connection plate body 122 in parallel and attaching the first connection plate body 112 to the second connection plate body 122, the connection stability of the first clamping housing 110 and the second clamping housing 120 is enhanced.

It should be understood by the skilled in the art that an example is only shown in the figure. In other embodiments, the first fixed connection structure and the second fixed connection structure may further include two welding parts disposed on the first clamping housing 110 and the second clamping housing 120, and the two welding parts are connected by welding. Or the first fixed connection structure and the second fixed connection structure may further include two locking pieces disposed on the first clamping housing 110 and the second clamping housing 120, and the two locking pieces are fixedly connected by a lockset.

Refer to FIG. 2 again, in some embodiments, the angle adjusting support 130 may include a first fixing plate 131, three ball head fixing blocks 132, and three ball head bolts 133, the first fixing plate 131 is used for fixing the millimeter-wave radar, the three ball head fixing blocks 132 are fixed to the second clamping housing 120, the ball head fixing blocks 132 are provided with spherical grooves, ball head ends of the ball head bolts 133 are rotatably clamped in the spherical grooves, and threaded ends of the ball head bolts 133 are connected to the first fixing plate 131.

Figure 4:
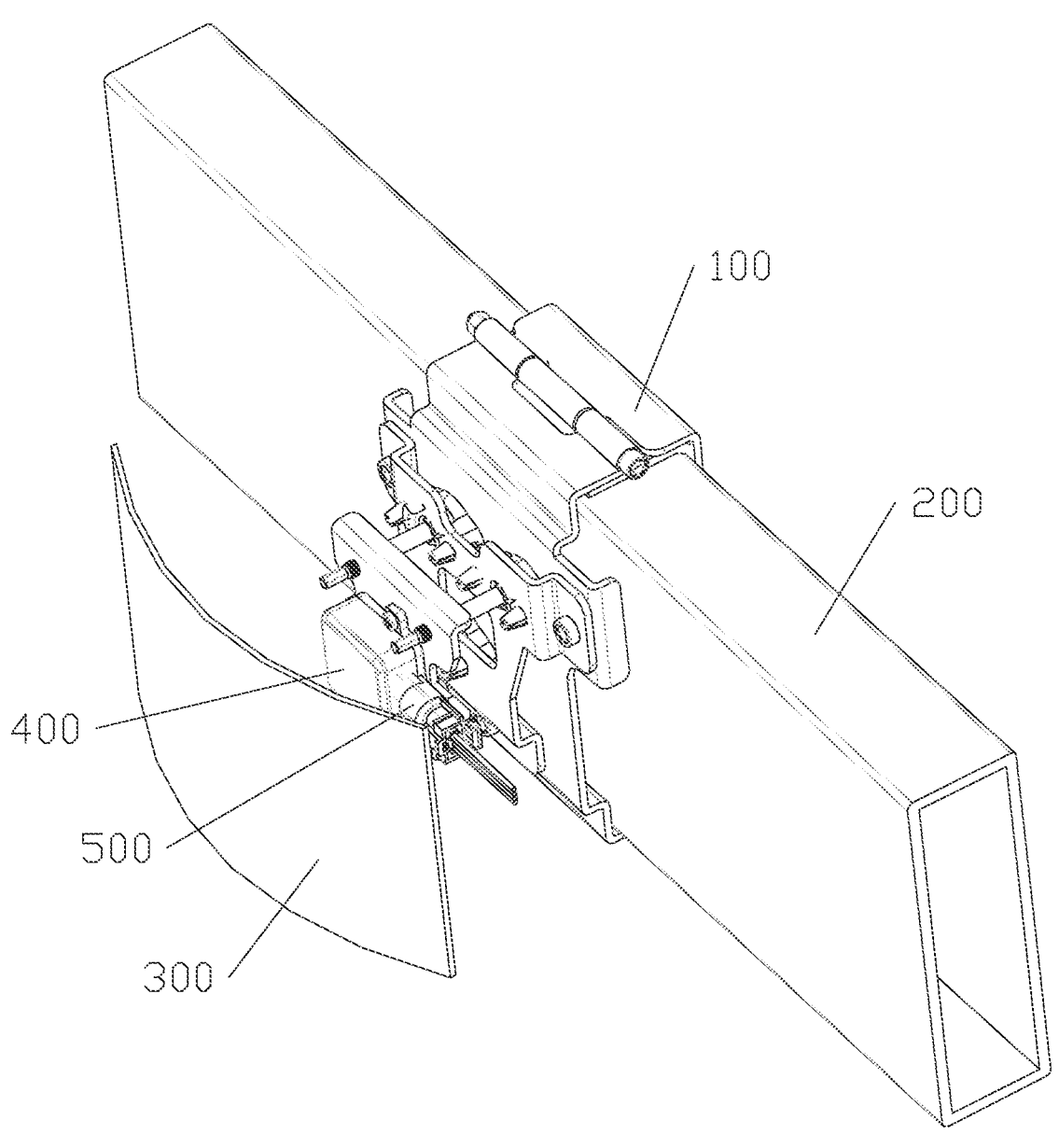
FIG. 4 is a schematic diagram of a partial structure of an automobile provided in an embodiment of the present invention.

Refer to FIG. 4 which shows a side structure achieved after a millimeter-wave radar is fixed to an angle adjusting support 130 in a fixing device 100 provided in an embodiment of the present invention. By rotatably fixing the ball head ends of the three ball head bolts 133 in the spherical grooves of the ball head fixing blocks 132, and connecting the threaded ends to the first fixing plate 131, on one hand, the fixation of fixing device 100 for the millimeter-wave radar is achieved, and on the other hand, inclination angles of the ball head bolts 133 are adjusted by means of rotation of the ball head bolts 133 in the spherical grooves, and then, horizontal and pitch angles of the millimeter-wave radar are adjusted.

In some embodiments, inner walls of the spherical grooves may be provided with flexible rubber layers. By disposing the flexible rubber layers, the friction between each of the spherical grooves and each of the ball head ends of the ball head bolts 133 is increased, then, the stability obtained when the ball head bolts 133 are fixed at any inclination angles is achieved, and at the same time, abrasion caused after the ball head ends of the ball head bolts 133 and the inner walls of the spherical grooves rotate repeatedly is avoided.

Refer to FIG. 2 again, in some embodiments, a raised plate body 123 may be formed on the second clamping housing 120 in a direction where the first fixing plate 131 is located, penetration holes 124 allowing the ball head fixing blocks 132 to penetrate are formed in the raised plate body 123, an accommodating space for accommodating the ball head fixing blocks 132 is formed on the inner side of the raised plate body 123, the angle adjusting support 130 may further include a second fixing plate, the second fixing plate includes a main plate body 134 disposed on a side, away from the first clamping housing 110, of the raised plate body 123 and fixedly connected to the ball head fixing blocks 132, and a fixing plate body 135 formed by vertically extending at least partial edge of the main plate body 134 to a direction where the raised plate body 123 is located, and then, vertically extending the same to the outer side, the ball head bolts 133 penetrate through the main plate body 134, and the fixing plate body 135 is fixedly connected to the raised plate body 123.

By disposing the raised plate body 123 on the second clamping housing 120 and disposing the penetration holes 124 in the raised plate body 123, the ball head fixing blocks 132 may be at least partially accommodated in the accommodating space on the inner side of the raised plate body 123, so that the ball head fixing blocks 132 are positioned and protected by the raised plate body 123. By disposing the second fixing plate provided with the main plate body 134 and the fixing plate body 135, the ball head fixing blocks 132 are fixed to the main plate body 134, the fixing plate body 135 is fixedly connected to the raised plate body 123, and the ball head bolts 133 penetrate through the main plate body 134, so that the overall structure of the angle adjusting support 130 is stable and reliable, and still has good structural stability after the ball head bolts 133 rotate for any angles and are then fixed.

In some embodiments, it is also possible that the angle adjusting support 130 is not provided with the second fixing plate, and the ball head fixing blocks are directly fixed to the second clamping housing 120 by using buckles or threaded connecting pieces.

Refer to FIG. 2 again, in some embodiments, the ball head fixing blocks 132 are provided with buckles 136 parallel to the ball head bolts 133, the main plate body 134 is provided with openings 137 adapted to the buckles 136, and the buckles 136 are clamped in the openings 137.

By disposing the buckles 136 and the openings 137, the fixation of the ball head fixing blocks 132 on the main plate body 134 is achieved, and at the same time, it is convenient to assemble and disassemble the ball head fixing blocks 132, so that the convenience in maintenance and replacement of the ball head fixing blocks 132 is improved. By fixing the buckles 136 in parallel to the ball head bolts 133, higher stability and reliability are achieved when the buckles 136 are clamped with the openings 137, and at the same time, it is convenient to easily adjust the inclination angles of the ball head bolts 133.

Further refer to FIG. 2, in a specific embodiment shown in the figure, the buckles 136 are disposed on two sides of the ball head fixing blocks 132 and are integrated with the ball head fixing blocks 132 so as to be stable in structure.

It should be understood by the skilled in the art that an example is only shown in the figure. In other embodiments, the ball head fixing blocks 132 may also be fixedly connected to the main plate body 134 by using threaded connecting pieces or fixed to the main plate body 134 by using the buckles 136 and the threaded connecting pieces.

Refer to FIG. 2 again, in some embodiments, two sides of the raised plate body 123 vertically extend to a direction where the second clamping housing 120 is located to form a supporting plate body 125, and the supporting plate body 125 is used for abutting against the frame of the automobile.

By disposing the supporting plate body 125 abutting against the frame of the automobile, the stability of the fixing device 100 fixed to the frame is further improved.

Further refer to FIG. 2, in some embodiments, first threaded holes 138 and second threaded holes 139 are formed in the first fixing plate 131, the first threaded holes 138 are connected to the threaded ends of the ball head bolts 133, and the second threaded holes 139 are used to be connected to the millimeter-wave radar.

By disposing the first threaded holes 138 and the second threaded holes 139, the convenient connection between the first fixing plate 131 and each of the ball head bolts 133 and the millimeter-wave radar is achieved.

According to the other aspect of the present invention, provided is an automobile.

Figure 5:
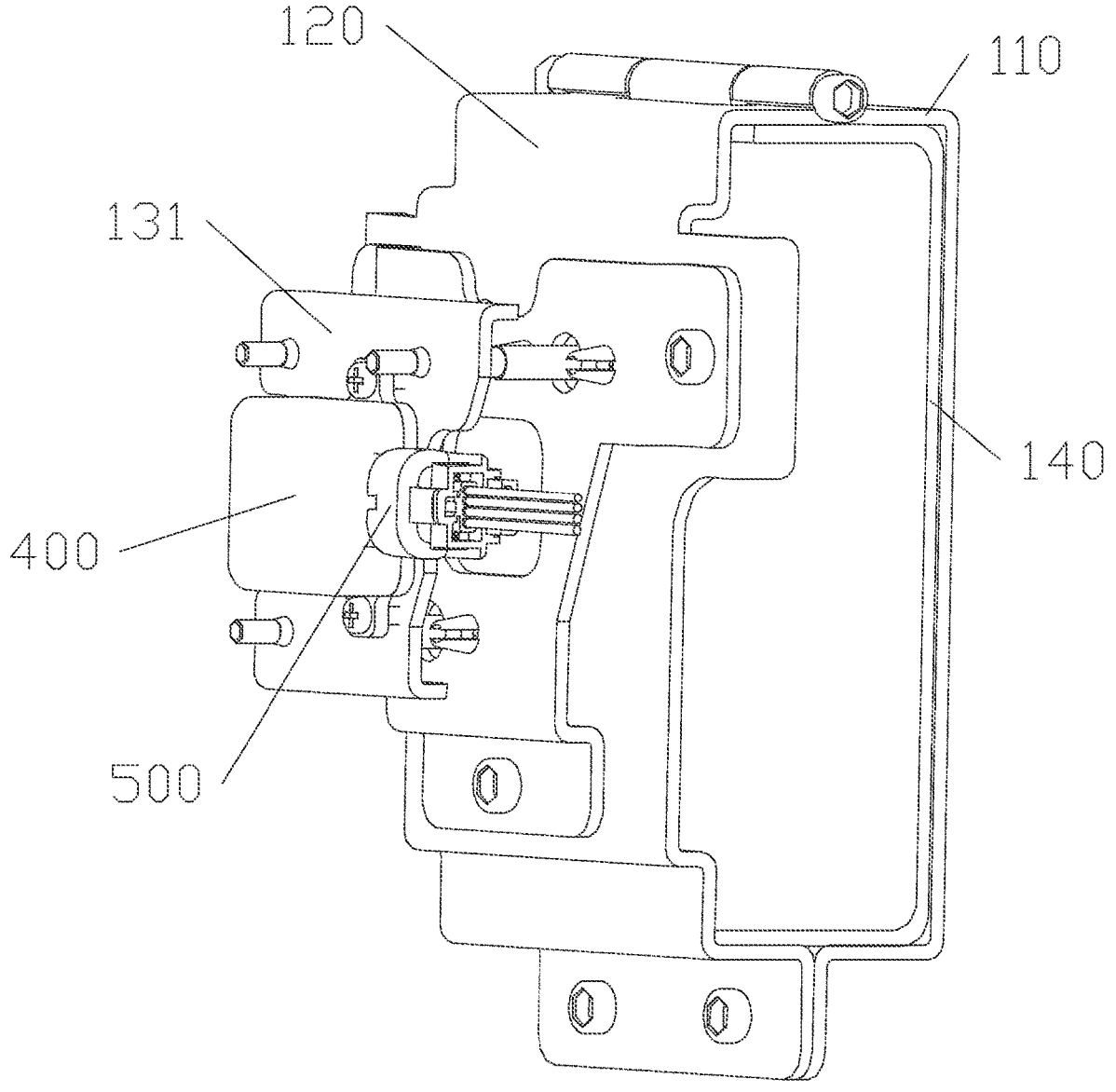
FIG. 5 is a schematic structural diagram of connection between a fixing device in an automobile provided in an embodiment of the present invention and a millimeter-wave radar.

Refer to FIG. 4 and FIG. 5 in which partial structure of an automobile provided in another embodiment of the present invention is schematically shown.

As shown in the figures, the automobile includes a frame 200, a bumper 300, a millimeter-wave radar 400, a radar interface 500, a vehicle controller, and the fixing device 100. The frame 200 is disposed on the inner side of the bumper 300, the frame 200 is accommodated in the clamping space, the second clamping housing 120 and the first clamping housing 110 are clamped and fixed on the frame 200, the millimeter-wave radar 400 is fixed to the angle adjusting support 130 and is disposed to face the bumper 300, the radar interface 500 is connected to a socket of the millimeter-wave radar 400, and the radar interface 500 is electrically connected to the vehicle controller.

According to the automobile in the embodiment of the present invention, the millimeter-wave radar 400 is stably and reliably fixed on the frame 200 of the automobile by the fixing device 100, so that it is convenient to dismount and maintain the millimeter-wave radar 400, and a monitoring direction of the millimeter-wave radar 400 can also be adjusted by adjusting the horizontal and pitch angles of the millimeter-wave radar 400. The vehicle controller is electrically connected to the millimeter-wave radar 400 by the radar interface 500 to control the work of the millimeter-wave radar 400 and receive monitoring information fed back by the millimeter-wave radar 400.

It should be noted that unless otherwise defined, technical terms or scientific terms used in the embodiments of the present invention shall be ordinary meanings as understood by those skilled in the art to which the embodiments of the present invention belong.

In the description of the embodiments of the present invention, directional or positional relationships indicated by technical terms such as "central", "longitudinal", "transverse", "length", "width", "thickness", "upper", "lower", "front", "rear", "left", "right", "vertical", "horizontal", "top", "bottom", "inner", "outer", "clockwise", "anticlockwise", "axial", "radial" and "circumferential" are directional or positional relationships based on the accompanying drawings, are merely intended to facilitate describing the embodiments of the present invention and simplifying the description, rather than to indicate or imply that the appointed device or element has to be located in a specific direction or structured and operated in the specific direction so as not to be understood as limitations on the present invention.

In addition, technical terms such as "first" and "second" are for descriptive purposes only, and cannot be understood as indicating or implying the relative importance or implicitly indicating the number of indicated technical features. In the description of the embodiments of the present invention, the meaning of "a plurality of" may be more than two unless it may be specifically defined otherwise.

In the description of the embodiments of the present invention, technical terms such as "mounted", "connected" and "connection" should be understood in a broad sense unless otherwise specified and defined. For example, "connection" may be fixed connection or detachable connection or an integral whole, may be mechanical connection or electrical connection, may be direct connection or indirect connection through an intermediate medium, and may be internal connection of two elements or interaction between two elements. For those of ordinary skill in the art, the specific meanings of the above-mentioned terms in the embodiments of the present invention may be understood according to specific situations.

In the description of the embodiments of the present invention, unless explicitly specified and defined otherwise, situations that a first feature is located "above" or "below" a second feature may include that the first and second features are in direct contact, or the first and second features are in indirect contact via an intermedium. Furthermore, situations that a first feature is located "above" or "on the upside of" or "on" a second feature may include that the first feature is located directly above and obliquely above the second feature, or simply means that the horizontal height of the first feature is greater than that of the second feature. Situations that a first feature is located "below" or "on the downside of" or "under" a second feature may include that the first feature is located directly below and obliquely below the second feature, or simply means that the horizontal height of the first feature is smaller than that of the second feature.

Finally, it should be noted that the above-mentioned embodiments are merely intended to describe the technical solutions of the present invention, rather than to limit the technical solutions of the present invention. Although the present invention has been described in detail with reference to the aforementioned embodiments, it should be understood by those of ordinary skill in the art that the skilled in the art may still modify the technical solutions recorded in each of the foregoing embodiments or equivalently substitute parts or all of technical features therein. These modifications or substitutions do not make the essences of the corresponding technical solutions depart from the scope of the technical solutions of the embodiments of the present invention, and should be covered in the scope of the claims and description of the present invention. Particularly, all technical features mentioned in the embodiments may be combined in any way as long as there are no structural conflicts thereamong. The present invention includes all the technical solutions falling within the scope of the claims, but is not limited to specific embodiments disclosed herein.

The invention claimed is:

1. An automobile millimeter-wave radar fixing device, comprising:

a first clamping housing, the first clamping housing being U-shaped, and having one end provided with a first rotatable connection structure and the other end provided with a first fixed connection structure;

10 a second clamping housing, the second clamping housing being U-shaped, and having one end provided with a second rotatable connection structure and the other end provided with a second fixed connection structure, the second rotatable connection structure being rotatably connected to the first rotatable connection structure, the second fixed connection structure being fixedly connected to the first fixed connection structure, and a clamping space for accommodating a frame of an automobile being formed between the first clamping housing and the second clamping housing;

an angle adjusting support, the angle adjusting support being fixed to a side, away from the clamping space, of the second clamping housing and being used for fixing and adjusting horizontal and pitch angles of a millimeter-wave radar; and wherein the angle adjusting support comprises a first fixing plate, three ball head fixing blocks, and three ball head bolts, the first fixing plate is used for fixing the millimeter-wave radar, the three ball head fixing blocks are fixed to the second clamping housing, the ball head fixing blocks are provided with spherical grooves, ball head ends of the ball head bolts are rotatably clamped in the spherical grooves, and threaded ends of the ball head bolts are connected to the first fixing plate.

2. The automobile millimeter-wave radar fixing device according to claim 1, wherein the first rotatable connection structure comprises a first shaft hole disposed in one end of the first clamping housing, the second rotatable connection structure comprises second shaft holes disposed in one end of the second clamping housing, and the first shaft hole is rotatably connected to the second shaft holes via a pivot shaft.

3. The automobile millimeter-wave radar fixing device according to claim 1, wherein the first fixed connection structure comprises a first connection plate body disposed on the other end of the first clamping housing, the second fixed connection structure comprises a second connection plate body disposed on the other end of the second clamping housing, and the first connection plate body is fixedly connected to the second connection plate body.

4. The automobile millimeter-wave radar fixing device according to claim 1, wherein inner walls of the spherical grooves are provided with flexible rubber layers.

5. The automobile millimeter-wave radar fixing device according to claim 1, wherein a raised plate body is formed on the second clamping housing in a direction where the first fixing plate is located, penetration holes allowing the ball head fixing blocks to penetrate are formed in the raised plate body, an accommodating space for accommodating the ball head fixing blocks is formed on the inner side of the raised plate body, the angle adjusting support further comprises a second fixing plate, the second fixing plate comprises a main plate body disposed on a side, away from the first clamping housing, of the raised plate body and fixedly connected to the ball head fixing blocks, and a fixing plate body formed by vertically extending at least partial edge of the main plate body to a direction where the raised plate body is located, and then, vertically extending the same to the outer side, the ball head bolts penetrate through the main plate body, and the fixing plate body is fixedly connected to the raised plate body.

6. The automobile millimeter-wave radar fixing device according to claim 5, wherein the ball head fixing blocks are provided with buckles parallel to the ball head bolts, the main plate body is provided with openings adapted to the buckles, and the buckles are clamped in the openings.

7. The automobile millimeter-wave radar fixing device according to claim 1, wherein first threaded holes and second threaded holes are formed in the first fixing plate, the first threaded holes are connected to the threaded ends of the ball head bolts, and the second threaded holes are used to be connected to the millimeter-wave radar.

8. The automobile millimeter-wave radar fixing device according to claim 1, wherein the automobile millimeter-wave radar fixing device further comprises a buffer gasket, and the buffer gasket is attached to a side, facing the clamping space, of the first clamping housing and a side, facing the clamping space, of the second clamping housing.

9. An automobile, comprising a frame, a bumper, a millimeter-wave radar, a radar interface, a vehicle controller, and the automobile millimeter-wave radar fixing device according to claim 1, the frame being disposed on the inner side of the bumper, the frame being accommodated in the clamping space, the second clamping housing and the first clamping housing being clamped and fixed on the frame, the millimeter-wave radar being fixed to the angle adjusting support and being disposed to face the bumper, the radar interface being connected to a socket of the millimeter-wave radar, and the radar interface being electrically connected to the vehicle controller.

\* \* \* \* \*